United States Patent
Kobayashi et al.

(10) Patent No.: US 8,580,213 B2
(45) Date of Patent: Nov. 12, 2013

(54) METHOD FOR RECOVERING NICKEL FROM SULFURIC ACID AQUEOUS SOLUTION

(75) Inventors: Hiroshi Kobayashi, Niihama (JP); Hirofumi Shoji, Niihama (JP); Norihisa Toki, Niihama (JP); Keiji Kudo, Niihama (JP); Tatsuya Higaki, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 299 days.

(21) Appl. No.: 13/057,683

(22) PCT Filed: Feb. 2, 2010

(86) PCT No.: PCT/JP2010/051400
§ 371 (c)(1),
(2), (4) Date: Feb. 4, 2011

(87) PCT Pub. No.: WO2010/090176
PCT Pub. Date: Aug. 12, 2010

(65) Prior Publication Data
US 2011/0135547 A1 Jun. 9, 2011

(30) Foreign Application Priority Data
Feb. 4, 2009 (JP) .................... 2009-023376

(51) Int. Cl.
*B01D 11/00* (2006.01)
(52) U.S. Cl.
USPC .............................. 423/139; 423/138; 423/140
(58) Field of Classification Search
USPC .......................... 423/139, 138, 140
See application file for complete search history.

(56) References Cited

U.S. PATENT DOCUMENTS

| 3,141,764 | A | * | 7/1964 | Matsuzuka et al. | 423/142 |
| 4,029,733 | A | | 6/1977 | Faugeras et al. | |
| 4,594,102 | A | * | 6/1986 | Weir et al. | 205/583 |

FOREIGN PATENT DOCUMENTS

| AU | 9960618 A | * | 8/2000 |
| JP | 50-140319 A | | 11/1975 |
| JP | 8-092665 A | | 4/1996 |
| JP | 2000-234130 A | | 8/2000 |
| JP | 2005-350766 A | | 12/2005 |

(Continued)

OTHER PUBLICATIONS

International Search Report for PCT/JP2010/051400, mailing date Apr. 27, 2010.

*Primary Examiner* — Melvin C Mayes
*Assistant Examiner* — Melissa Stalder
(74) *Attorney, Agent, or Firm* — Westerman, Hattori, Daniels & Adrian, LLP (57) ABSTRACT

A method for recovering nickel from sulfuric acid aqueous solution, for recovering nickel in an effectively utilizable form as a raw material of nickel industry material, by separating efficiently impurity elements of iron, aluminum, manganese, etc., from the sulfuric acid aqueous solution containing nickel and cobalt, and the impurity elements, iron, aluminum, manganese, etc. The method comprises the following steps: subject the sulfuric acid aqueous solution to oxidation neutralization treatment; then subject the solution to neutralization treatment, and separate and recover mixed hydroxides containing nickel and cobalt; subject the mixed hydroxides to dissolution treatment in a sulfuric acid solution having a concentration of equal to or higher than 50% by mass; subject the concentrated solution to solvent extraction treatment, using a phosphate ester-based acidic extraction agent; add a neutralizing agent to the resultant extraction residual liquid; subject the solution to the neutralization treatment, and separate and recover nickel hydroxide generated.

10 Claims, 2 Drawing Sheets

(56) References Cited

FOREIGN PATENT DOCUMENTS

| | | |
|---|---|---|
| JP | 2006-001817 A | 1/2006 |
| JP | 2006-144102 A | 6/2006 |
| JP | 2006-241529 A | 9/2006 |
| JP | 2008-527164 A | 7/2008 |
| JP | 2009-203082 A | 9/2009 |
| RU | 2203969 C2 * | 5/2003 |

* cited by examiner

METHOD FOR RECOVERING NICKEL FROM SULFURIC ACID AQUEOUS SOLUTION

BACKGROUND OF THE INVENTION

1. Field of the Invention

The present invention relates to a method for recovering nickel from an sulfuric acid aqueous solution, and more specifically the present invention relates to a recovering method for nickel from the sulfuric acid aqueous solution, which is capable of enhancing economical efficiency as a smelting process, as well as recovering nickel in an effectively utilizable form as a raw material of nickel industry material such as metallic nickel, nickel oxide, ferronickel, and at the same time, separating cobalt, which is an expensive valuable metal, as a byproduct easy to utilize, by removing efficiently impurity elements of iron, aluminum, manganese and the like, from the sulfuric acid aqueous solution containing nickel and cobalt, and the impurity elements of iron, aluminum, manganese and the like. In this way, the present invention is suitably used as a method for separating and recovering nickel and cobalt from a leach solution containing various kinds of impurity elements produced from the leaching step of various leach methods such as a High Pressure Acid Leach Method for a nickel laterite ore.

2. Description of the Prior Art

Conventionally, there has been required technology to separate and recover nickel economically efficiently from the sulfuric acid aqueous solution containing nickel, along with the impurity elements of beginning from cobalt and other various kinds. For example, in recent years, in nickel smelting process, a hydrometallurgical process has been attracted attention, which is based on an acid leach method of a nickel laterite ore with a sulfuric acid solution. This acid leach method does not include the dry step such as the reducing step, the drying step, differing from a pyrometallurgical process, which is a conventional general metallurgical process for a nickel laterite ore, and is thus advantageous in view of energy cost, therefore, it is viewed as promising technology as a metallurgical process for a low content nickel laterite ore, for example, having a nickel content of about 1 to 2% by mass, also from now on. In such a hydrometallurgical process, a leach solution to be produced is the sulfuric acid aqueous solution containing nickel, along with various kinds of impurity elements such as, beginning fromcobalt, iron, aluminum, manganese, zinc, chromium, magnesium, silicon, contained in an ore, and it was an important problem in view of a smelting process, to separate and recover nickel, and cobalt, if necessary, by an efficient means.

It should be noted that, as the above hydrometallurgical process, for example, the following processes (A) to (C) have been proposed.

Hydrometallurgical Process (A):

This method is composed of the following steps (1) to (4), and produces mixed sulfides containing nickel and cobalt from a nickel laterite ore, using a High Pressure Acid Leach Method (for example, refer to Patent Document 1).

(1) Leaching step: to make slurry of a nickel laterite ore and to add sulfuric acid, and to stir at a temperature of 220 to 280° C., to form leaching slurry.
(2) Solid-liquid separation step: to wash the aforesaid leaching slurry using a thickener with multi-stages to separate it into a leach solution containing nickel and cobalt, and a leach residue containing iron as hematite.
(3) Neutralization step: to adjust pH to equal to or lower than 4 using calcium carbonate, while suppressing oxidation of the aforesaid leach solution to generate a neutralization precipitate containing trivalent iron and to separate it into neutralization precipitate slurry and mother liquor for nickel recovery. and
(4) Sulfurization step: to blow hydrogen sulfide gas into the aforesaid mother liquor for nickel recovery to generate a sulfide containing nickel and cobalt, and to separate it from barren liquor.

Hydrometallurgical Process (B):

This method is composed of the step to form a leach residue by converting iron to natrojarosite, and obtain a leach solution containing nickel and cobalt; the step to remove iron and aluminum by adding a neutralizing agent to the resultant leach solution; the step to obtain a extraction residual liquid containing nickel and a back extraction liquid containing cobalt, by solvent extraction treatment of the resultant neutralized solution with a monothiophosphinic acid compound as an extraction agent to extract cobalt; and the step to obtain a hydroxide by neutralizing the resultant extraction residual liquid containing nickel and the back extraction liquid containing cobalt, with an alkali, respectively, in leaching by adding sulfuric acid to a nickel laterite ore. Subsequent to these steps, still more, after removing sulfur and chlorine by washing the resultant nickel hydroxide with an alkali solution, by supplying it, with the nickel laterite ore, to a ferronickel production plant including firing and reduction melting steps, nickel hydroxide is used as apart of raw materials for ferronickel production (for example, refer to Patent Document 2).

Hydrometallurgical Process (C):

This method is composed of the step to obtain an acidic eluent containing nickel with a Ni concentration of 10 to 80 g/L, cobalt, aluminum, iron or the like, by separating a resin, which absorbed nickel and cobalt, from slurry, and leaching this resin; the step to remove iron and aluminum by neutralizing the aforesaid acidic eluent at a pH of 4.5 to 5; the step to obtain an extraction residual liquid containing nickel and a back extraction liquid containing cobalt, by solvent extraction treatment the resultant neutralized solution with an extraction agent, Cyanex 272, to extract cobalt, manganese or the like; and the step to obtain a hydroxide by neutralizing the resultant extraction residual liquid containing nickel with magnesium hydroxide; in what is called a RIP (Resin In Pulp) method, in which an ion-exchange resin is added into acid leach solution slurry of a nickel laterite ore formed in the atmospheric pressure step or the high pressure acid leaching step (for example, refer to Patent Document 3).

However, in the hydrometallurgical process (A), because it is one not to separate nickel and cobalt, and recover them as mixed sulfides, although the resultant mixed sulfides are suitable as raw materials of a smelting process provided with the steps to leach them, then separate nickel and cobalt to recover each of them as a highly pure product, for example, a chlorine leach method, but on the other hand, it had a problem not able to be used directly, as raw materials for production of, for example, ferronickel or stainless steel production, in a process having limitation in view of load of cobalt, sulfur or the like in supplied raw materials.

In addition, in the hydrometallurgical process (B), although the resultant nickel hydroxide can be used as a raw material of ferronickel production, because cobalt has been separated and sulfur has been removed, but on the other hand, there was a problem, as a problem in view of a smelting process, that nickel concentration of a neutralization solution, as a starting solution of the solvent extraction step, is several g/L, the same level as that of a leach solution, because the special step is not installed for increasing nickel concentration of the leach solution and the neutralization solution, and thus in a solvent extraction treatment using such a low concentration solution, use amount of the extraction agent and equipment scale become too large, which is not economically efficient due to loss of the extraction agent and equipment cost.

In addition, in the hydrometallurgical process (C), although the resultant nickel hydroxide, in which cobalt is separated, and thus can be utilized effectively as a raw material of metallic nickel, nickel oxide, ferronickel or the like, but on the other hand, there was an economical problem in a leach method itself, because the RIP (Resin In Pulp) method is adopted in the leaching step, as a smelting process, because of wear or the like of an expensive ion-exchange resin in slurry, use amount and loss thereof becomes excessive, as well as nickel concentration of an acidic eluent, as a starting solution of the solvent extraction step, is 10 to 80 g/L at most, although concentration effect is expected by use of the ion-exchange resin, and thus in a solvent extraction treatment using such a low concentration solution, use amount of the extraction agent and equipment scale become excessive, similarly as in the hydrometallurgical process (B).

In addition, in the hydrometallurgical processes (B) and (C), because the special step is not installed for removing manganese from the starting solution of the solvent extraction step, in adopting a phosphate ester-type acidic extraction agent as the extraction agent to extract cobalt from the starting solution to an organic phase, extraction efficiency of cobalt deteriorates influenced by manganese extracted together, therefore, there were also problems of increase in use amount of the extraction agent and increase in manganese concentration in the back extraction liquid containing cobalt.

In view of the above circumstances, there has been required a method which is capable of enhancing economical efficiency as a metallurgical process, as well as recovering nickel in an effectively utilizable form as a raw material of nickel industry material such as metallic nickel, nickel oxide, ferronickel or the like, and at the same time, separating cobalt as a byproduct easy to utilize, by removing efficiently impurity elements of iron, aluminum, manganese and the like, from the sulfuric acid aqueous solution containing nickel and cobalt, and the impurity elements, iron, aluminum, manganese and the like.

PRIOR DOCUMENTS

Patent Documents

Patent Document 1: JP-A-2005-350766 (page 1, page 2)
Patent Document 2: JP-A-2006-241529 (page 1, page 2, FIG. 1)
Patent Document 3: JP-A-2008-527164 (page 1, page 2)

SUMMARY OF THE INVENTION

In view of the above conventional technical problems, it is an object of the present invention to provide a method for recovering nickel from the sulfuric acid aqueous solution, which is capable of enhancing economical efficiency as a smelting process, as well as recovering nickel in an effectively utilizable form as a raw material of nickel industry material such as metallic nickel, nickel oxide, ferronickel, and at the same time, separating cobalt, which is an expensive valuable metal, as a byproduct easy to utilize, by removing efficiently impurity elements of iron, aluminum, manganese and the like, from the sulfuric acid aqueous solution containing nickel and cobalt, and the impurity elements of iron, aluminum, manganese and the like.

Means for Solving the Problem

The present inventors have intensively studied a method for recovering nickel from the sulfuric acid aqueous solution containing nickel and impurity elements of cobalt, iron, aluminum, manganese and the like, to attain the aforesaid objects, and found that by performing sequentially, the step to subject the sulfuric acid aqueous solution to oxidation neutralization treatment under specific condition, and to remove iron and aluminum; the step to subject the resultant solution after the oxidation neutralization treatment to neutralization treatment under specific condition, and to separate and recover mixed hydroxides containing nickel and cobalt; the step to subject the resultant mixed hydroxides to dissolution treatment under specific condition, and to obtain a concentrated solution of nickel and cobalt, while removing manganese; the step to subject the resultant concentrated solution to oxidation treatment under specific condition, and to remove manganese; the step to subject the resultant solution after the oxidation treatment to solvent extraction treatment under specific condition, to obtain an extraction residual liquid containing nickel and an back extraction liquid containing cobalt; and the step to subject the resultant extraction residual liquid to the neutralization treatment, nickel hydroxide which can be effectively utilized as a raw material of industrial material can be recovered in high yield, as well as cobalt can be recovered also in an easy to utilize state, and have thus completed the present invention.

That is, according to a first aspect of the present invention, there is provided a method for recovering nickel from an sulfuric acid aqueous solution containing nickel and cobalt, and impurity elements of iron, aluminum, manganese and the like, characterized by comprising the following steps (1) to (5):

step (1): by adding calcium carbonate into the sulfuric acid aqueous solution, under blowing mixed gas composed of sulfurous acid gas and air or oxygen gas, to subject the solution to oxidation neutralization treatment, and to remove a precipitate (a) containing iron and aluminum generated;

step (2): by adding calcium hydroxide to the liquid after the oxidation neutralization treatment, obtained in the step (1), to subject the liquid to neutralization treatment, and to separate and recover mixed hydroxides containing nickel and cobalt;

step (3): by subjecting the mixed hydroxides obtained in the step (2) to dissolution treatment in a sulfuric acid solution having a concentration of equal to or higher than 50% by mass, to remove a precipitate (b) containing manganese and gypsum generated, and to obtain a concentrated solution of nickel and cobalt;

step (4): by subjecting the concentrated solution obtained in the step (3) to solvent extraction treatment, using a phosphate ester-based acidic extraction agent, to obtain an extraction residual liquid containing nickel, and an back extraction liquid containing cobalt; and step (5): by adding a neutralizing agent to the extraction residual liquid obtained in the step (4), to subject the solution to the neutralization treatment, and to separate and recover nickel hydroxide generated.

In addition, according to a second aspect of the present invention, there is provided, in the first aspect, the method for recovering nickel from a sulfuric acid aqueous solution, characterized by still more comprising the following step (6) subsequent to the step (3):

the step (6): by adding a neutralizing agent into the concentrated solution of nickel and cobalt obtained in the step (3), under blowing mixed gas composed of sulfurous acid gas and air or oxygen gas, to subject the solution to the oxidation neutralization treatment, to remove a precipitate (c) containing manganese and cobalt generated, and to transfer the resultant solution after the oxidation neutralization treatment to the step (4).

In addition, according to a third aspect of the present invention, there is provided, in the first or the second aspect, the method for recovering nickel from an aqueous sulfuric acid solution, characterized by still more comprising the following step (7) or step (8):

step (7): by adding a neutralizing agent to the back extraction liquid obtained in the step (4), to subject the liquid to the neutralization treatment, and to separate and recover cobalt hydroxide generated.

step (8): by adding hydrogen sulfide gas or alkali sulfide to the back extraction liquid obtained in the step (4), to subject the liquid to sulfurization treatment, and to separate and recover cobalt sulfide generated.

In addition, according to a fourth aspect of the present invention, there is provided, in any one of the first to the third aspects, the method for recovering nickel from an sulfuric acid aqueous solution, characterized in that the oxidation neutralization treatment in the step (1) satisfies the following requisites (i) to (iii):

(i) content ratio of sulfurous acid gas in the mixed gas is 1 to 10% by volume, based on air or oxygen gas as dilution gas;

(ii) oxidation-reduction potential (based on a silver/silver chloride electrode) is 400 to 600 mV; and (iii) pH is 4.0 to 4.5.

In addition, according to a fifth aspect of the present invention, there is provided, in any one of the first to the third aspects, the method for recovering nickel from an sulfuric acid aqueous solution, characterized in that the neutralization treatment in the step (2) satisfies the following requisite (iv):

(iv) pH is 7.5 to 7.7.

In addition, according to a sixth aspect of the present invention, there is provided, in any one of the first to the third aspects, the method for recovering nickel from an sulfuric acid aqueous solution, characterized in that the dissolution treatment in the step (3) satisfies the following requisites (v) and (vi):

(v) slurry concentration is 30 to 40% by mass;

(vi) pH at completion of dissolution of the mixed hydroxides is 1.5 to 2.2.

In addition, according to a seventh aspect of the present invention, there is provided, in any one of the first to the third aspects, the method for recovering nickel from an sulfuric acid aqueous solution, characterized by comprising a step to transfer the precipitate (b) to the step (1), in the step (3).

In addition, according to a eighth aspect of the present invention, there is provided, in any one of the first to the third aspects, the method for recovering nickel from an aqueous sulfuric acid solution, characterized in that the neutralization treatment in the step (5) satisfies the following requisites (vii) to (ix):

(vii) pH is 7.5 to 8.0;

(viii) the neutralizing agent is magnesium hydroxide;

(ix) reaction temperature is a temperature of 80° C. to boiling temperature.

In addition, according to a ninth aspect of the present invention, there is provided, in the second or the third aspect, the method for recovering nickel from an sulfuric acid aqueous solution, characterized in that the oxidation neutralization treatment in the step (6) satisfies the following requisites (x) to (xiii):

(x) content ratio of sulfurous acid gas in the mixed gas is 1 to 10% by volume relative to air or oxygen gas;

(xi) oxidation-reduction potential (based on a silver/silver chloride electrode) is 500 to 600 mV;

(xii) pH is 5.0 to 6.0;

(xiii) the neutralizing agent is sodium hydroxide.

In addition, according to a tenth aspect of the present invention, there is provided, in any one of the first to the ninth aspects, the method for recovering nickel from an sulfuric acid aqueous solution, characterized in that the sulfuric acid aqueous solution is a leach solution produced from the step to leach under high temperature and high pressure, by adding a sulfuric acid solution to slurry of a nickel laterite ore.

The method for recovering nickel of the present invention from the sulfuric acid aqueous solution is capable of recovering nickel hydroxide with nickel content concentrated to equal to or higher than 40% by mass, which can be effectively utilized as a raw material of nickel industry material such as metallic nickel, nickel oxide, ferronickel, by removing efficiently impurity elements of iron, aluminum, manganese and the like, from the sulfuric acid aqueous solution containing nickel and cobalt, and the impurity elements of iron, aluminum, manganese and the like. In addition, it is capable of separating cobalt, which is an expensive valuable metal, as a usable byproduct. As understood from the above, industrial value thereof is extremely high.

DETAILED DESCRIPTION OF THE INVENTION

Explanation will be given below in detail on the method for recovering nickel of the present invention, from a sulfuric acid aqueous solution.

The method for recovering nickel of the present invention, from a sulfuric acid aqueous solution is a method for recovering nickel from a sulfuric acid aqueous solution containing nickel and cobalt, and impurity elements of iron, aluminum, manganese and the like, characterized by comprising the following steps (1) to (5).

step (1): by adding calcium carbonate into the sulfuric acid aqueous solution, under blowing mixed gas composed of sulfurous acid gas and air or oxygen gas, to subject the solution to oxidation neutralization treatment, and to remove a precipitate (a) containing iron and aluminum generated.

step (2): by adding calcium hydroxide to the solution after the oxidation neutralization treatment, obtained in the step (1), to subject the solution to neutralization treatment, and to separate and recover mixed hydroxides containing nickel and cobalt.

step (3): by subjecting the mixed hydroxides obtained in the step (2) to dissolution treatment in a sulfuric acid solution having a concentration of equal to or higher than 50% by mass, to remove a precipitate (b) containing manganese and gypsum generated, and to obtain a concentrated solution of nickel and cobalt.

step (4): by subjecting the concentrated solution obtained in the step (3) to solvent extraction treatment, using a phosphate ester-based acidic extraction agent, to obtain an extraction residual liquid containing nickel, and an back extraction liquid containing cobalt.

step (5): by adding a neutralizing agent to the extraction residual liquid obtained in the step (4), to subject the solution to the neutralization treatment, and to separate and recover nickel hydroxide generated.

In the present invention, it is important that, in the step (1), by adding calcium carbonate into the sulfuric acid aqueous solution, under blowing mixed gas composed of sulfurous acid gas and air or oxygen gas, and subjecting the solution to oxidation neutralization treatment, a precipitate (a) containing iron and aluminum generated is removed; in the step (2), by adding calcium hydroxide to the solution after the oxidation neutralization treatment, and subjecting the solution to neutralization treatment, mixed hydroxides containing nickel and cobalt are separated and recovered; and in the step (3), by subjecting the mixed hydroxides obtained in the step (2) to dissolution treatment in a sulfuric acid solution having a concentration of equal to or higher than 50% by mass, and removing a precipitate (b) containing manganese and gypsum generated, a concentrated solution of nickel and cobalt is obtained. In this way, it is possible to remove iron, aluminum and manganese, which compete with cobalt in extraction, from a starting solution of the solvent extraction treatment, in the solvent extraction treatment using a phosphate ester-based acidic extraction agent, among impurity elements contained in the sulfuric acid aqueous solution.

That is, in the step (1), by adding calcium carbonate, under blowing mixed gas composed of sulfurous acid (SO2) gas and air or oxygen gas, and subjecting the solution to oxidation neutralization treatment, a peroxide is generated using sulfur dioxide as a medium, due to blowing of the mixed gas, and divalent iron is quickly and completely oxidized to trivalent iron to generate iron hydroxide (Fe(OH)3). In this case, by adding calcium carbonate, such oxidation condition is attained, and such pH can be maintained that solubility of hydroxides of the trivalent iron and aluminum decreases sufficiently low, therefore nearly complete removal of iron and aluminum in the solution can be attained. In this way, a problem of iron and aluminum having high accumulation property in the extraction agent can be solved. It should be noted that, detail thereof will be described later in detailed explanation on the step.

In addition, in the step (2), by subjecting the solution after the oxidation neutralization treatment to the neutralization treatment, and separating and recovering mixed hydroxides containing nickel and cobalt, because nickel and cobalt in the sulfuric acid aqueous solution, is recovered once as mixed hydroxides, and they are dissolved again in the subsequent dissolution treatment, and thus a concentrated solution with high nickel concentration can be generated, it becomes possible to increase nickel concentration in a starting solution to a large degree, in the subsequent solvent extraction treatment. For example, nickel concentration in the concentrated solution is 30 to 70 g/L, relative to several g/L in a leach solution, therefore, in a solvent extraction treatment using such a high concentration solution, use amount of the extraction agent and equipment scale can be reduced, which extremely enhances economical efficiency due to decrease in loss of the extraction agent and equipment cost.

In addition, in the step (3), by subjecting the mixed hydroxides to dissolution treatment in the sulfuric acid solution having a concentration of equal to or higher than 50% by mass, the concentrated solution with high nickel concentration can be obtained, as well as manganese is separated as a precipitate in a form of manganese oxides ($Mn_3O_4$, $Mn_2O_3$, $MnO_2$) under dissolving nickel and cobalt contained in said mixed hydroxides. In this step, the separation is attained by oxidation of divalent manganese to tetravalent manganese and forming a precipitate caused by solubility, in the high concentration sulfuric acid aqueous solution. In addition, gypsum ($CaSO_4$) formed from calcium contained in said mixed hydroxides also forms a precipitate caused by solubility. It should be noted that, detail thereof will be described later in detailed explanation on the step.

1. Step (1)

The step (1) is the step where, by adding calcium carbonate into the sulfuric acid aqueous solution containing nickel and cobalt, and the impurity elements of iron, aluminum, manganese and the like, under blowing mixed gas composed of sulfurous acid gas and air or oxygen gas, and subjecting the solution to oxidation neutralization treatment, a precipitate (a) containing iron and aluminum generated is removed.

In this way, iron and aluminum having high accumulation property in the extraction agent, are nearly completely removed in the subsequent solvent extraction treatment.

In the above step (1), as the neutralizing agent, calcium carbonate is used, which has lower equilibrium pH as compared with other alkaline agents, and is capable of preventing nickel loss caused by local neutralization, as well as cheap. In addition, mixed gas composed of sulfurous acid gas and air or oxygen gas is used, as an oxidizing agent of divalent iron in a solution. In general, addition of hydrogen peroxide water or other peroxides is effective as the above oxidizing agent, however, utilization of these to iron removal does not balance in cost On the other hand, mixed gas composed of sulfurous acid gas and air or oxygen gas is effective as the oxidizing agent of divalent iron by the above described action mechanism. Explanation will be given on this point with reference to drawings.

Figure 1:
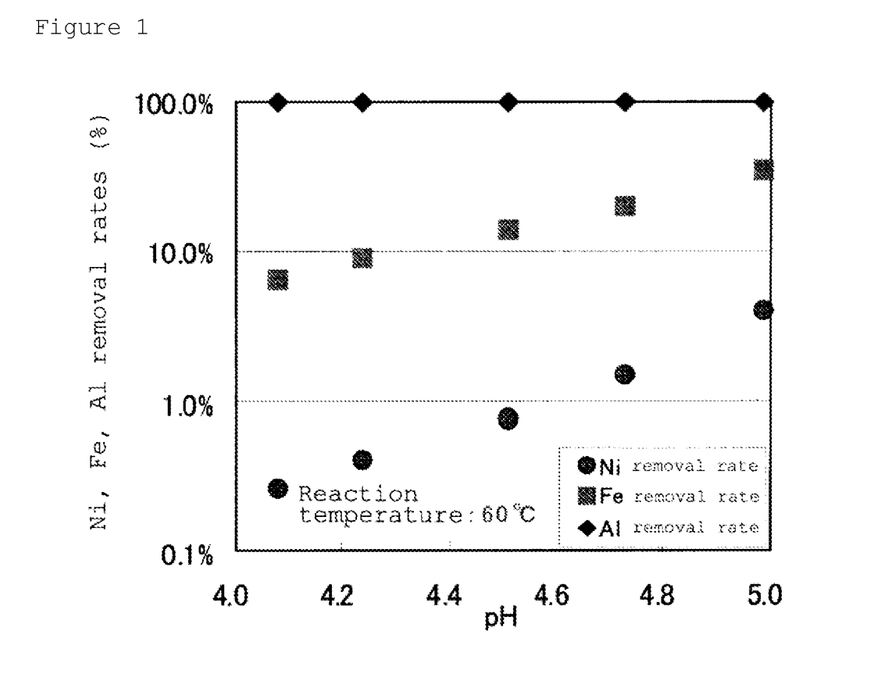
FIG. 1 is a drawing showing distribution ratios (removal rates) of iron, aluminum and nickel in a solution, into a precipitate to be generated, in the neutralization treatment using calcium carbonate as a neutralizing agent, according to a conventional method.

Firstly, FIG. 1 shows removal rates (distribution ratios to generated precipitates) of iron, aluminum and nickel in a solution, in the neutralization treatment using calcium carbonate as a neutralizing agent, according to a conventional method. In this step, as a starting solution of the neutralization treatment, a leach solution (after neutralization of free sulfuric acid) of a limonite ore having composition of Ni: 3.3 g/L, Fe: 0.6 g/L and Al: 3.4 g/L, was used, and calcium carbonate slurry with a concentration of 20% by mass was added, and under control of solution temperature at 60° C., pH was maintained at predetermined value in a range of 4 to 5 for 5 minutes, and the resultant slurry after neutralization was filtered and analyzed.

From FIG. 1, it is understood that, even under such pH condition that nickel precipitates equal to or more than 1%, removal rate of iron is about 10 to 20%. On the contrary, it is understood that, removal of aluminum can be performed nearly completely at pH of equal to or higher than 4.

Figure 2:
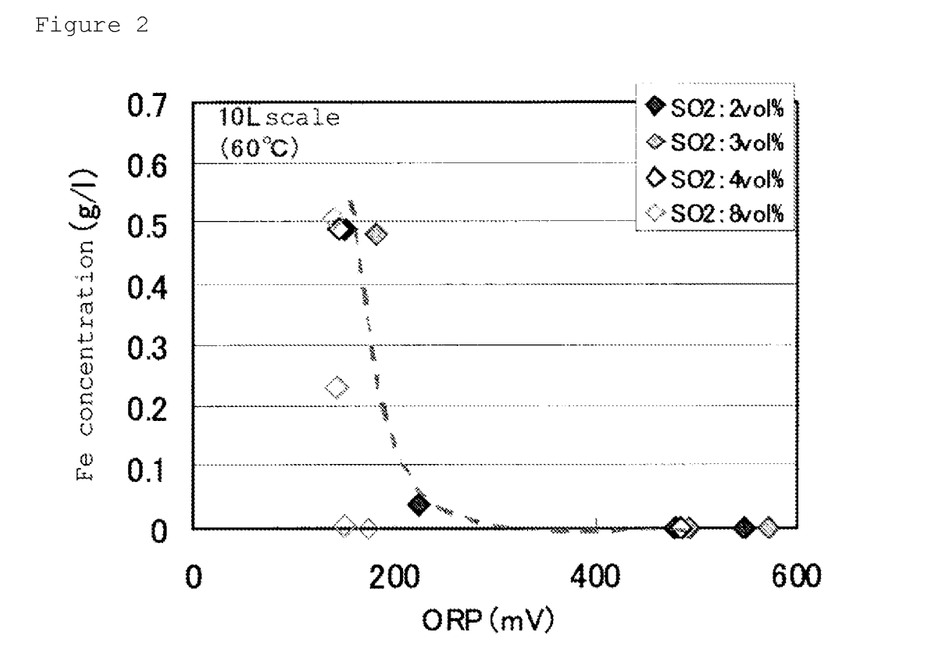
FIG. 2 is a drawing showing relation between iron concentration in a solution and oxidation-reduction potential (ORP), in an oxidation neutralization treatment using mixed gas composed of sulfurous acid gas and air, and calcium carbonate, in the step (1) of the present invention.

Next, FIG. 2 shows relation between iron concentration in a solution and oxidation-reduction potential (ORP), in an oxidation neutralization treatment using mixed gas composed of sulfurous acid gas and air, and calcium carbonate, by the method of the above step (1). From FIG. 2, it is understood that by increasing oxidation-reduction potential (based on a silver/silver chloride electrode) to equal to or higher than about 200 mV, iron concentration in a solution rapidly decreases and iron can be nearly completely removed at 500 to 600 mV. It should be noted that, aluminum in a solution has been removed nearly completely under this pH condition. In this step, as a starting solution of the oxidation neutralization treatment, a leach solution (after neutralization of free sulfuric acid) of a limonite ore, similar to that in FIG. 1, was used, and calcium carbonate slurry with a concentration of 20% by mass, was added, while blowing mixed gas containing air and SO2 gas by 2, 3, 4 or 8% by volume, each relative to air, and under control of solution temperature at 60° C., pH was maintained at 4.5 for 100 minutes, and the resultant slurry after oxidation neutralization was filtered and analyzed.

Figure 3:
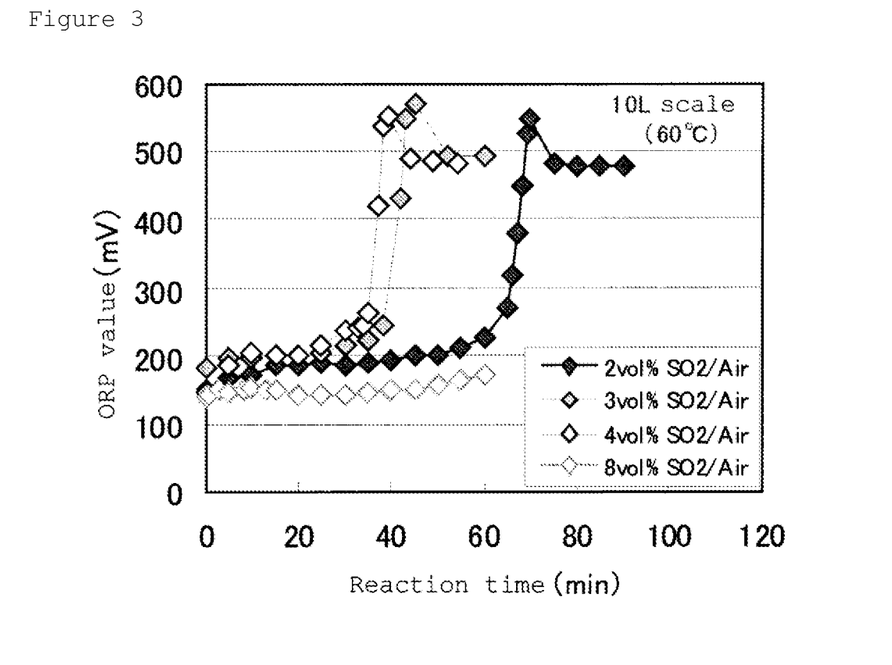
FIG. 3 is a drawing showing change of oxidation-reduction potential (ORP) accompanying with passage of reaction time, in the oxidation neutralization treatment using mixed gas composed of sulfurous acid gas and air, and calcium carbonate, in the step (1) of the present invention.

FIG. 3 shows change of oxidation-reduction potential (ORP) accompanying with passage of reaction time, in the oxidation neutralization treatment using mixed gas composed of sulfurous acid gas and air, and calcium carbonate, in the method of the above step (1). From FIG. 3, it is understood that, at 8% by volume of sulfurous acid gas, it becomes difficult to surely judge end point of an oxidation neutralization reaction by control of oxidation-reduction potential. In the present description, data in FIG. 3 is one obtained under similar condition as in FIG. 2.

In the above step (1), condition of the oxidation neutralization treatment is not especially limited, however, it is preferable to satisfy the following requisites (i) to (iii):

(i) content ratio of sulfurous acid gas in the mixed gas is 1 to 10% by volume relative to air or oxygen gas as dilution gas, and preferably 1 to 5% by volume, when dilution gas is air;

(ii) oxidation-reduction potential (based on a silver/silver chloride electrode) is 400 to 600 mV; and (iii) pH is 4.0 to 4.5.

That is, in the requisite (a), as content ratio of sulfurous acid gas, the higher is the more desirable in view of enhancing oxidation efficiency by the addition of sulfurous acid gas, and content equal to or higher than 1% by volume relative to air or oxygen gas, is used to obtain high removal rate of iron. On the other hand, the content ratio of over 10% by volume provides stronger tendency for sulfurous acid gas to act as a reducing agent, and tends to decrease oxidation efficiency. In addition, when dilution gas is air, the content ratio of over 5% by volume makes difficult to surely judge end point of an oxidation neutralization reaction by control of oxidation-reduction potential. It should be noted that, by utilization of exhaust gas containing sulfurous acid gas, exhausted from a general metallurgical plant, as it is, mixed gas is supplied in low cost.

In the requisite (b), as oxidation-reduction potential (based on a silver/silver chloride electrode) of the oxidation neutralization reaction, the higher is the more desirable in view of enhancing oxidation removal rate of iron, and potential equal to or higher than 500 mV is used in performing nearly complete oxidation removal of iron. On the other hand, oxidation-reduction potential (based on a silver/silver chloride electrode) of over 600 mV decreases removal effect of iron over expectation, and thus increases use amount of the oxidizing agent. In the present description, as a control method for oxidation-reduction potential, it can be performed mainly by adjusting content ratio of sulfuric acid gas in the mixed gas, and blowing amount thereof.

In the requisite (c), as pH of the oxidation neutralization reaction, the higher is the more desirable in view of enhancing oxidation removal rate of iron, and pH equal to or higher than 4.0 is used to obtain high removal rate of iron. On the other hand, pH of over 4.5 increases co-precipitation of nickel and thus decreases yield. In the present description, as a control method for pH, it can be performed by adjusting addition amount of calcium carbonate.

In addition, in the above oxidation neutralization treatment, solution temperature is not especially limited, however, 40 to 80° C. is preferable, and about 60° C. is more preferable to obtain high removal rate of iron. That is, the solution temperature below 40° C. provides insufficient oxidation removal of iron. On the other hand, the solution temperature of over 80° C. provides equipment constraint to a reactor, as well as requires energy for raising temperature, and thus increases cost.

In the above step (1), the oxidation neutralization treatment is not especially limited, however, it is performed using a reactor provided with a stirring mechanism, an ORP control mechanism, a pH control mechanism, and a solution temperature control mechanism. In addition, it is preferable that whole amount of slurry after the oxidation neutralization treatment is subjected to solid-liquid separation using a filter machine such as filter press, to obtain the precipitate (a) containing iron and aluminum, and a clear solution after the oxidation neutralization treatment. That is, it is important to prevent leakage of iron and aluminum components as suspended substances (SS), in the subsequent steps.

2. Step (2)

The above step (2) is the step where by adding calcium hydroxide to the solution after the oxidation neutralization treatment, obtained in the above step (1), and subjecting the solution to neutralization treatment, mixed hydroxides containing nickel and cobalt is separated and recovered. In this step, nickel and cobalt in the solution after the oxidation neutralization treatment, are once recovered as precipitates. In this way, mixed hydroxides having a nickel content of 25 to 45% by mass, can be obtained, therefore it becomes possible to obtain a concentrated solution with high nickel concentration by the subsequent dissolution treatment, and still more enhance to a large degree nickel concentration in a starting solution thereof in the solvent extraction treatment. In the solvent extraction treatment using this concentrated solution with high nickel concentration as a starting solution, use amount of the extraction agent and equipment scale can be reduced, which extremely enhances economical efficiency due to decrease in loss of the extraction agent and equipment cost.

In the above step (2), condition of the neutralization treatment is not especially limited, however, it is preferable to satisfy the following requisite (iv):

(iv) pH is 7.5 to 7.7.

That is, as pH of the neutralization reaction, the higher is the more desirable in view of enhancing precipitation ratio (recovery ratio) of nickel and cobalt, and pH equal to or higher than 7.5 is used to obtain a high recovery ratio of equal to or higher than 97%. On the other hand, the pH of over 7.7 abruptly increases precipitation ratio of manganese in a solution, which becomes contained in the mixed hydroxides, and still more resulting in giving adverse influence on extraction efficiency of cobalt in the subsequent solvent extraction treatment. Therefore, pH of the neutralization reaction is selected in considering precipitation ratio (recovery ratio) of nickel and cobalt, and precipitation ratio of manganese. It should be noted that, as a neutralizing agent to attain such pH condition, other alkaline agents may be used as well, however, it can be attained by using cheap calcium hydroxide.

In the above neutralization treatment, solution temperature is not especially limited, however, 50 to 80° C. is preferable, and about 60° C. is more preferable to obtain high recovery ratio of nickel and cobalt. That is, the solution temperature of below 50° C. decreases reaction rate and generates an unreacted portion in the neutralization reagent. On the other hand, the solution temperature of over 80° C. provides equipment constraint to a reactor, as well as requires energy for raising temperature, and thus increases cost.

In the above step (2), the neutralization treatment is not especially limited, however, it is performed using a reactor provided with a stirring mechanism, a pH control mechanism, and a solution temperature control mechanism. In addition, it is preferable that whole amount of slurry after the oxidation neutralization is subjected to solid-liquid separation using a filter machine such as filter press or the like, to obtain the mixed hydroxides containing nickel and cobalt, and a filtrate. In this case, when the method of the present invention is adopted in the hydrometallurgical process for a nickel laterite ore by the High Pressure Leach Method, the filtrate and a washing solution containing nickel and cobalt, which leak a little, can be reused as washing water of a leach residue in the leaching step thereof or the subsequent solid-liquid separation step, therefore, loss of nickel and cobalt in the above step (2) little generates.

3. Step (3)

The above step (3) is the step where by subjecting the mixed hydroxides obtained in the above step (2) to dissolution treatment in the sulfuric acid solution having a concentration of equal to or higher than 50% by mass, and removing a precipitate (b) containing manganese and gypsum generated, a concentrated solution of nickel and cobalt is obtained. In this step, the concentrated solution with high nickel concentration is obtained, by dissolving nickel and cobalt contained in said mixed hydroxides, as well as manganese is separated as a precipitate in a form of manganese oxides ($Mn_3O_4$, $Mn_2O_3$, $MnO_2$). By this step, oxidation removal of 40 to 60% of manganese is possible, as well as a nickel dissolution ratio of 99% and a cobalt dissolution ratio of 96% are attained.

In the above step (3), the dissolution treatment is performed as follows.

The mixed hydroxides were mixed with a sulfuric acid solution having predetermined concentration, then slurry concentration is adjusted by adding water, and after that, predetermined amount of the sulfuric acid solution having predetermined concentration was added so that pH after completion of dissolution became a predetermined value. For example, the sulfuric acid solution having a concentration of 64% by mass is added to the mixed hydroxides having a water content of 30 to 50% by mass, so as to be 1 equivalent relative to nickel and cobalt contained, and subjected to first mixing. Next, slurry concentration was adjusted so as to be 30 to 40% by mass by adding water. Finally, by adding again the sulfuric acid solution having a concentration of 64% by mass, pH of the solution was adjusted so as to be between 1.5 and 2.2.

In the above step (3), sulfuric acid concentration of the sulfuric acid solution to be used in dissolving the mixed hydroxides, is equal to or higher than 50% by mass, preferably 50 to 98% by mass, and more preferably 64 to 98% by mass. In this way, the concentrated solution with high nickel concentration is obtained, as well as 40 to 60% of manganese contained in the mixed hydroxides can be separated as a precipitate. That is, the sulfuric acid concentration of below 50% by mass is insufficient in obtaining the concentrated solution with high nickel concentration, and in oxidizing and separating manganese as a precipitate in a form of manganese oxides ($Mn_3O_4$, $Mn_2O_3$, $MnO_2$).

In the above step (3), condition of the dissolution treatment is not especially limited, however, it is preferable to satisfy the following requisites (v) and (vi).

(v) slurry concentration of sulfuric acid solution slurry, in which mixed hydroxides are charged, is 30 to 40% by mass;

(vi) pH at completion of dissolution of the mixed hydroxides is 1.5 to 2.2.

That is, in the requisite (v), as the slurry concentration, the higher is the more desirable in view of enhancing nickel concentration of the resultant concentrated solution, and concentration equal to or higher than 30% by mass is effective. On the other hand, the slurry concentration of over 40% by mass requires enhanced washing of valuable metal components adhered to the leach residue, and thus it is not desirable. However, by gradually adding the mixed hydroxides into the sulfuric acid solution under dissolving, a concentrated solution with still higher concentration can be produced.

In the requisite (vi), as pH at completion of the dissolution, the lower is the more desirable in view of enhancing dissolution ratio of nickel and cobalt, and 1.5 to 2.2, which seldom changes said dissolution rate is used, however, it is important to suppress use amount of the neutralizing agent in the subsequent solvent extraction treatment, by adjusting pH so as not to decrease too low.

Explanation will be given on these points, with reference to a drawing.

Figure 4:
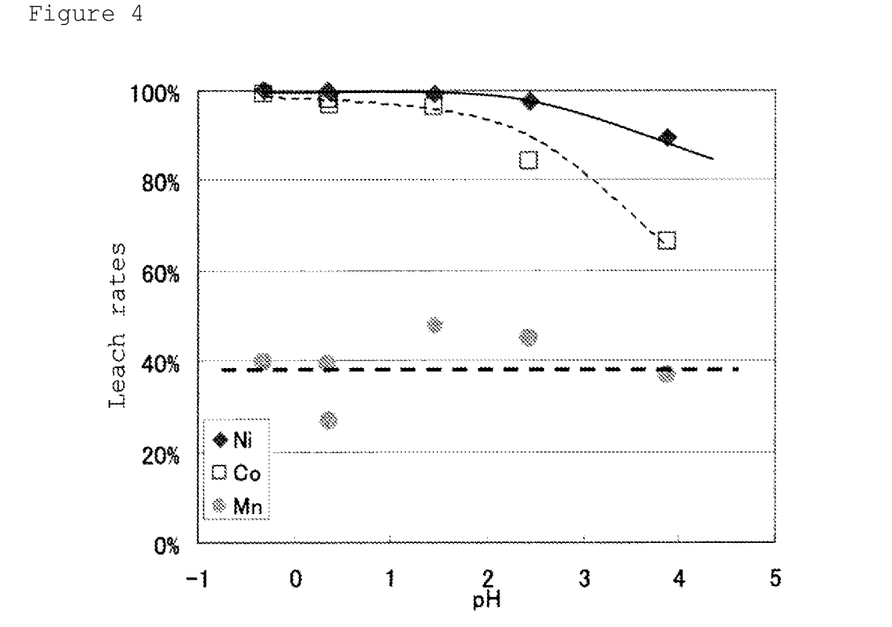
FIG. 4 is a drawing showing relation between dissolution ratios (leach ratios) of nickel, cobalt and manganese, and pH, in a dissolution treatment of mixed hydroxides with a sulfuric acid solution having a concentration of 64% by mass, in the step (3) of the present invention.

FIG. 4 shows relation between leach ratios (dissolution ratios) of nickel, cobalt and manganese, and pH, in the dissolution treatment of the mixed hydroxides with the sulfuric acid solution having a concentration of 64% by mass. From FIG. 4, it is understood that at the pH of equal to or lower than 2.2, dissolution rate of nickel and cobalt is constant at nearly 10%, and dissolution rate of manganese is 40 to 60%.

In this step, as the mixed hydroxides, those obtained by the oxidation neutralization treatment of a leach solution (after neutralization of free sulfuric acid) of a limonite ore, and then by the neutralization treatment, having composition of Ni: 22% by mass, Co: 1.1% by mass, and Mn: 5.4% by mass, are used, and after adding and mixing the sulfuric acid solution with a concentration of 64% by mass to the said mixed hydroxides, by changing addition amount, slurry concentration was adjusted to 30% by mass by adding pure water. After that, pH at completion of dissolution was measured, and dissolved slurry was filtered and analyzed.

In the above step (3), the dissolution treatment is not especially limited, however, it is performed using a reactor provided with a stirring mechanism, and a pH measurement mechanism. In addition, it is preferable that the whole amount of slurry after the dissolution treatment is subjected to solid-liquid separation using a filter machine such as filter press, to obtain a concentrated solution containing nickel and cobalt and the precipitate (b) containing manganese and gypsum. In addition, at this step, it is desirable to have the step to transfer the precipitate (b) to the step (1), as needed, to recover nickel and cobalt adhered.

4. Step (4)

The above step (4) is the step where by subjecting the concentrated solution obtained in the above step (3) to the solvent extraction treatment, using a phosphate ester-based acidic extraction agent, an extraction residual liquid containing nickel and a back extraction liquid containing cobalt are obtained.

In this step, nickel and cobalt in the above concentrated solution are separated. In this case, when manganese is copresent in the concentrated solution, it is extracted together with cobalt by the above extraction agent, and still more distributed in a back extraction liquid.

In the above step (4), the solvent extraction treatment is composed of an extraction stage for mixing a water phase composed of the above concentrated solution and an organic phase composed of solvent containing the phosphate ester-based acidic extraction agent to extract cobalt into the organic phase by adjusting pH, then separating both phases; and a back extraction stage for mixing the resultant organic phase and a sulfuric acid solution to extract cobalt into the sulfuric acid solution, then separating both phases. In this step, most parts of nickel remain in the extraction residual liquid.

The phosphate ester-based acidic extraction agent is not especially limited, and any one, which provides good separation of nickel and cobalt, and small extraction of calcium, can be utilized, however, for example, Cyanex 272 (product name) is used, which is produced by Cytex Co., Ltd., U.S.A.

In the extraction stage, pH adjustment can be performed easily by using an aqueous solution containing an alkaline agent such as sodium hydroxide. In this stage, it is desirable that equilibrium pH of the water phase is maintained at about 5. It should be noted that, by suitably setting volume ratio of the organic phase and the water phase, and extraction stage number, cobalt equal to or more than 98% can be extracted. However, in this stage, about 10% of nickel is also extracted at the same time, therefore, installment of a scrubbing stage for washing the organic phase with a diluted acid, before back extraction of cobalt from the organic phase after extraction, is effective in view of preventing nickel loss. In addition, in the above back extraction stage, cobalt extracted into the organic phase is back extracted as a sulfate salt together with impurity elements such as manganese.

5. Step (5)

The above step (5) is the step where by adding a neutralizing agent to the extraction residual liquid obtained in the above step (4), and subjecting the solution to the neutralization treatment, nickel hydroxide generated is separated and recovered. In this way, a precipitate of nickel hydroxide, with a nickel content of 40 to 45% by mass, can be obtained. In this step, nickel in the above extraction residual liquid forms a precipitate as nickel hydroxide, by a neutralization reaction, and it is recovered by filtration separation.

In the above step (5), the neutralization treatment is not especially limited, however, it is preferable to satisfy the following requisites (vii) to (ix):

(vii) pH is 7.5 to 8.0;
(viii) the neutralizing agent is magnesium hydroxide;
(ix) reaction temperature is a temperature of 80° C. to boiling temperature.

That is, in the requisite (vii), as the pH in the above neutralization treatment, the higher is the more desirable to avoid loss of nickel, and equal to or higher than 7.5 is used, in which sufficient precipitation ratio of nickel can be obtained. On the other hand, the pH of over 8.0 does not provide effect over expectation and increases use amount of the neutralizing agent.

In addition, in the requisite (viii), as the neutralizing agent, other alkaline agents may be used, however, use of calcium hydroxide results in decreasing nickel content because of generation and deposition of gypsum, which comingles into a precipitate, therefore magnesium hydroxide is preferable.

In addition, in the requisite (ix), when magnesium hydroxide is used as the neutralizing agent, temperature of 80° C. to boiling point is preferable, because practical rate of the neutralization reaction can be obtained.

6. Step (6)

In the recovery method of the present invention, it can include still more the following step (6) subsequent to the above step (3). In this way, because manganese remained in the concentrated solution is removed as a hydroxide, efficiency decrease in cobalt extraction caused by manganese can be suppressed in the subsequent solvent extraction treatment. In addition, because of reduction of extraction load in the solvent extraction treatment, design of the smaller solvent extraction step becomes possible.

Step (6): by adding a neutralizing agent into the concentrated solution of nickel and cobalt obtained in the step (3), under blowing mixed gas composed of sulfurous acid gas and air or oxygen gas, and subjecting the solution to the oxidation neutralization treatment, the precipitate (c) containing manganese and cobalt generated is removed, and the resultant solution after the oxidation neutralization treatment is transferred to the step (4).

In the step (6), the oxidation neutralization treatment is not especially limited, however, it is preferable to satisfy the following requisites (x) to (xiii):

(x) content ratio of sulfurous acid gas in the mixed gas is 1 to 10% by volume, relative to air or oxygen gas;
(xi) oxidation-reduction potential (based on a silver/silver chloride electrode) is 500 to 600 mV;
(xii) pH is 5.0 to 6.0;
(xiii) the neutralizing agent is sodium hydroxide.

That is, in the requisite (x), as the content ratio of sulfurous acid gas, the higher is the more desirable in view of enhancing oxidation efficiency by the addition of sulfurous acid gas, and ration equal to or higher than 1% by volume, relative to air or oxygen gas, is used, to obtain high removal rate of manganese. On the other hand, the content ratio of over 10% by volume tends for sulfurous acid gas to strengthen action as a reducing agent, and tends to decrease oxidation efficiency.

In the requisite (xi), as the oxidation-reduction potential (based on a silver/silver chloride electrode) of the oxidation neutralization reaction, the higher is the more desirable in view of increasing oxidation removal rate of manganese, and potential equal to or higher than 500 mV is used. On the other hand, the oxidation-reduction potential (based on a silver/silver chloride electrode) of over 600 mV has small removal effect of manganese over expectation, and thus increases use amount of an oxidizing agent. In the present description, as a control method for oxidation-reduction potential, it can be performed mainly by adjusting content ratio of sulfurous acid gas in the mixed gas, and blowing amount thereof.

In the requisite (xii), as the pH in the oxidation neutralization reaction, the higher is the more desirable in view of increasing oxidation removal efficiency of manganese, and pH equal to or higher than 5.0 is used to obtain high removal rate of manganese. On the other hand, the pH of over 6.0 increases co-precipitation of nickel and cobalt, and thus decreases yield. In the present description, as a control method of pH, it can be performed by using, for example, sodium hydroxide, as a neutralizing agent, and adjusting the addition amount thereof.

In addition, in the above oxidation neutralization treatment, solution temperature is not especially limited, however, 40 to 80° C. is preferable, and about 60° C. is more preferable, to obtain high removal rate of manganese. That is, the solution temperature below 40° C. provides insufficient oxidation removal of iron. On the other hand, the solution temperature of over 80° C. provides equipment constraint to a reactor, as well as requires energy for raising temperature, and thus increases cost.

7. Steps (7) and (8)

In the recovery method of the present invention, it can include still more the following step (7) or step (8), as needed. In this way, cobalt is recovered as cobalt hydroxide or cobalt sulfide, from the back extraction liquid obtained in the above step (4). Theses recovered substances are suitable as raw materials of a process containing the cobalt purification step.

Step (7): by adding a neutralizing agent to the back extraction liquid obtained in the step (4), and subjecting the solution to the neutralization treatment, cobalt hydroxide generated is separated and recovered.

Step (8): by adding hydrogen sulfide gas or alkali sulfide to the back extraction liquid obtained in the step (4), and subjecting the solution to sulfurization treatment, cobalt sulfide generated is separated and recovered.

In the above step (7), the neutralization treatment is not especially limited, however, it is preferable to satisfy the following requisites (xiv) to (xvi). In this way, cobalt hydroxide containing manganese can be obtained.

(xiv) pH is 7.5 to 9.0.

(xv) the neutralizing agent is such as sodium hydroxide, sodium carbonate, sodium hydrogen carbonate, ammonia, one not containing calcium which forms a low solubility salt.

(xvi) reaction temperature is temperature of 80° C. to boiling point.

In the above step (8), the sulfurization treatment is not especially limited, however, it is preferable to satisfy the following requisites (xvii) to (ixx). In this way, cobalt sulfide, in which a part of manganese is separated, can be obtained.

(xvii) pH is 2.0 to 4.0.

(xviii) oxidation-reduction potential (based on a silver/silver chloride electrode) is −250 to −100 mV.

(ixx) reaction temperature is temperature of 60° C. to boiling point.

9. Sulfuric Acid Aqueous Solution

The sulfuric acid aqueous solution to be used in the present invention is one containing nickel and cobalt, and impurity elements of iron, aluminum, manganese and the like, and one produced from various smelting processes for a nickel laterite ore is preferably used, including, for example, a leach solution produced from the step leaching under high temperature and high pressure, by adding a sulfuric acid solution to slurry of the nickel laterite ore, by the following leaching step and the solid-liquid separation step.

The leaching step: by making slurry of a nickel laterite ore, by adding sulfuric acid and by stirring treatment at a temperature of 220 to 280° C., leaching slurry is formed.

The solid-liquid separation step: by washing the leaching slurry using a thickener in multi-stages, it is separated into a leach solution containing nickel and cobalt, and a leach residue.

As the above nickel laterite ore, it is mainly a so-called laterite ore such as a limonite ore and a saprolite ore. Nickel content of the laterite ore is usually 0.8 to 2.5% by mass, and nickel is contained as a hydroxide thereof or a hydrous magnesium silicate (magnesium silicate) ore. In addition, iron content is 10 to 50% by mass, and iron is mainly in a form of trivalent hydroxide (goethite), but divalent iron is partly contained in the hydrous magnesium silicate ore or the like. In addition, silicic acid component is contained in a silica mineral such as quartz, cristobalite (amorphous silica) or the like, and a hydrous magnesium silicate ore. In addition, many of chromium components are also contained as a chromite ore containing iron or magnesium. In addition, magnesia component is contained in a hydrous magnesium silicate ore, as well as a magnesium silicate ore hardly having the unweathring high-hardness nickel. Still more, cobalt, aluminum and manganese are present as components co-existing in the ores, or in an ore having each element as a major component.

As composition of a leach solution produced by treatment in the above leaching step and solid-liquid separation step, using the above nickel laterite ore is, for example, Ni: 3.0 to 8.0 g/L, Co: 0.3 to 1.0 g/, Fe: 2.0 to 10.0 g/L, Al: 1.0 to 5.0 g/L, and Mn: 2.0 to 5.0 g/L, and other than these, zinc, chromium, magnesium, silicon or the like are contained, and thus it is suitably used as the sulfuric acid aqueous solution of the recovery method of the present invention.

EXAMPLES

Explanation will be given below in detail on the present invention, with reference to Examples of the present invention, however, the present invention should not be limited to these Examples. It should be noted that, analysis of metals used in Examples was performed using an ICP emission analysis method.

Example 1

Recovery of nickel hydroxide was performed by separating nickel using a leach solution obtained by the High Pressure Acid Leach Method of a laterite ore.

(1) The Leaching Step of the Laterite Ore 500 g of the laterite ore (composition; Ni: 1.1% by mass, Co: 0.1% by mass, Fe: 42.0% by mass, Mn: 0.8% by mass, and Al: 2.7% by mass) was taken, and 150 g of the sulfuric acid solution with a concentration of 64% by mass and water were added thereto, so as to adjust slurry concentration to 30% by mass.

This slurry was charged into a 3 Litter heat resistant container, and the container was put into a 3.5 Litter electrically heating-type autoclave and heated at 250° C., under stirring with a stirring apparatus, and after maintaining it at this temperature for 1 hour, it was cooled to room temperature to take out leaching slurry from the autoclave. The resultant leaching slurry was subjected to the neutralization treatment of sulfuric acid remained, using calcium carbonate slurry with a concentration of 20% by mass, and then by solid-liquid separation, a leach solution having composition of Ni: 3.8 g/L, Co: 0.2 g/L, Fe: 2.0 g/L, Al: 4.1 g/L and Mn: 2.8 g/L, and a pH of 2.5 was obtained.

(2) Step (1) (Oxidation Neutralization Treatment of the Leach Solution)

Mixed gas (which contains 3% by volume of SO2 gas based on air) composed of sulfurous acid gas and air was blown into a 10 Litter leach solution prepared as above, under control of solution temperature at 60° C., and by adding calcium carbonate slurry with a concentration of 20% by mass at the same time, oxidation pH was retained at 4.5. After that, when the oxidation-reduction potential (based on a silver/silver chloride electrode) reached 500 mV, slurry after the oxidation neutralization was filtered to separate the precipitate (a) containing iron and aluminum generated, and obtain a solution after the oxidation neutralization, which was analyzed.

Composition of the resultant solution after oxidation neutralization was Ni: 3.7 g/L, Co: 0.2 g/L, Fe: <0.001 g/L, Al: <0.001 g/L and Mn: 2.8 g/L. From this result, it is understood that iron and aluminum are nearly completely removed.

(3) Step (2) (Recovery of Mixed Hydroxides by the Neutralization Treatment)

By adding calcium hydroxide slurry with a concentration of 20% by mass, to 10 Litter of the solution after oxidation neutralization treatment obtained in the step (1), under control of solution temperature at 60° C., and subjecting the solution to the neutralization treatment by controlling pH at 7.6, slurry after the neutralization was filtered to obtain the mixed hydroxides containing nickel and cobalt generated, which was analyzed.

Composition of the resultant mixed hydroxides was Ni: 15.2% by mass, Co: 1.4% by mass, Fe: <0.01% by mass, Mn: 4.4% by mass and Al: <0.01% by mass, and precipitation ratio of nickel and cobalt was 98%.

(4) Step (3) (the Dissolution Treatment of the Mixed Hydroxides)

100 mL of the sulfuric acid solution having a concentration of 64% by mass was added and mixed to 300 g of the mixed hydroxides obtained in the step (2), and then pure water was added to adjust slurry concentration to 30% by mass. Still more, the sulfuric acid solution having a concentration of 64% by mass was added again to adjust pH at completion of dissolution at 2.0. After that, dissolved slurry was filtered, and by separating the precipitate (b) containing manganese and gypsum generated, the concentrated solution of nickel and cobalt was obtained and analyzed.

Composition of the resultant concentrated solution was Ni: 65.5 g/L, Co: 5.9 g/L and Mn: 10.5 g/L. From this result, it is understood that dissolution ratio of nickel and cobalt was 98%, elution ratio of manganese was 55%, and 45% of manganese in the mixed hydroxides was removed.

(5) Step (4) (Solvent Extraction Treatment)

The extraction residual liquid containing nickel and the back extraction liquid containing cobalt were obtained for analysis, by the solvent extraction treatment, using an apparatus composed of three-stage extraction stages for mixing the water phase composed of the concentrated solution obtained in the step (3), and the organic phase composed of solvent containing the phosphate ester-based acidic extraction agent, so as to be a ratio of the organic phase/water phase=2, adjusting pH at 4.5 to extract cobalt into the organic phase and separating both phases after that; and two-stage back extraction stages for mixing the resultant organic phase and the sulfuric acid solution, so as to be a ratio of the organic phase/water phase=2, to extract cobalt into the sulfuric acid solution, and separating both phases after that; and a scrubbing stage for washing the organic phase with a diluted acid.

Composition of the resultant extraction residual liquid was Ni: 50.5 g/L, Co: <0.1 g/L and Mn: <0.1 g/. In addition, composition of the back extraction liquid was Ni: 0.6 g/L, Co: 5.5 g/L and Mn: 10.0 g/L. From this result, it is understood that separation of nickel and cobalt is performed sufficiently.

(6) Step (5) (the Neutralization Treatment of the Extraction Residual Liquid)

By adding magnesium hydroxide slurry to the extraction residual liquid obtained in the step (4) for the neutralization treatment, nickel hydroxide, having composition of Ni: 44.4% by mass, Co: <0.1% by mass, Fe: <0.1% by mass, Mn: <0.1% by mass, and Al: <0.1% by mass, was obtained. From this result, it is understood that nickel hydroxide can be separated and recovered, which can be utilized effectively as a raw material of a nickel industrial material such as metallic nickel, nickel oxide, ferronickel.

Example 2

The manganese removal step (step (6)) was performed in accordance with the following procedure, using the concentrated solution obtained in the step (3) of the above Example 1.

First, mixed gas composed of sulfurous acid gas and air (which contains 1% by volume of $SO_2$ gas based on air) was blown, under control of solution temperature of the concentrated solution at 60° C., and by adding an aqueous solution of sodium hydroxide with a concentration of 4 mol/L at the same time, pH was maintained at 5.0. At this step, the oxidation-reduction potential (based on a silver/silver chloride electrode) was maintained at 550 mV for 4 hours. Then slurry after the oxidation neutralization was filtered to separate the precipitate (c) containing manganese and cobalt generated, and to obtain the solution after the oxidation neutralization treatment, which was analyzed.

Composition of the resultant solution after the oxidation neutralization treatment was Mn: 5.9 g/L. From this result, it is understood that because of reduction of extraction load in the solvent extraction step of the step (4), design of the smaller solvent extraction step becomes possible.

As described above, Example 1 was performed in accordance with the method of the present invention, by sequentially performing the step to subject the sulfuric acid aqueous solution to oxidation neutralization treatment under specific condition, and to remove iron and aluminum; the step to subject the resultant solution after the oxidation neutralization treatment to neutralization treatment under specific condition, and to separate and recover mixed hydroxides containing nickel and cobalt; the step to subject the resultant mixed hydroxides to the dissolution treatment under specific condition, and to obtain a concentrated solution of nickel and cobalt, while removing manganese; the step to subject the resultant concentrated solution to the oxidation treatment under specific condition, and to remove manganese; the step to subject the resultant solution after the oxidation treatment to the solvent extraction treatment under specific condition, to obtain an extraction residual liquid containing nickel, and an back extraction liquid containing cobalt; and the step to subject the resultant extraction residual liquid to the neutralization treatment, therefore, it is understood that nickel hydroxide which can be effectively utilized as a raw material of industrial material can be recovered in high yield, and cobalt can be separated as a utilizable byproduct. Still more, in Example 2, the manganese removal step (step (6)) was performed using the concentrated solution obtained in the above step (3), therefore, it is understood that extraction load in the solvent extraction step of the step (4) is reduced.

The method for recovering nickel of the present invention from the sulfuric acid aqueous solution is capable of recovering nickel hydroxide with nickel content concentrated to equal to or higher than 40% by mass, by removing efficiently impurity elements of iron, aluminum, manganese and the like, from the sulfuric acid aqueous solution containing nickel and cobalt, and the impurity elements of iron, aluminum, manganese and the like, therefore it is suitable as a method for recovering nickel hydroxide having low content of impurity elements, in particular, from the sulfuric acid aqueous solution with high manganese content.

What is claimed is:

1. A method for recovering nickel from a sulfuric acid aqueous solution containing nickel and cobalt, and impurity elements including iron, aluminum, manganese, characterized by comprising the following steps (1) to (5);

step (1): by adding calcium carbonate into the sulfuric acid aqueous solution, under blowing mixed gas composed of sulfurous acid gas and air or oxygen gas, to subject the solution to oxidation neutralization treatment, and to remove a precipitate (a) containing iron and aluminum generated;

step (2): by adding calcium hydroxide to the solution after the oxidation neutralization treatment obtained in the step (1), to subject the solution to neutralization treatment, and to separate and recover mixed hydroxides containing nickel and cobalt;

step (3): by subjecting the mixed hydroxides obtained in the step (2) to dissolution treatment in a sulfuric acid solution having a concentration of equal to or higher than 50% by mass, to remove a precipitate (b) containing manganese and gypsum generated, and to obtain a concentrated solution of nickel and cobalt;

step (4): by subjecting the concentrated solution obtained in the step (3) to solvent extraction treatment, using a phosphate ester-based acidic extraction agent, to obtain an extraction residual liquid containing nickel and a back extraction liquid containing cobalt;

step (5): by adding a neutralizing agent to the extraction residual liquid obtained in the step (4), to subject the solution to the neutralization treatment, and to separate and recover nickel hydroxide generated.

2. The method for recovering nickel from an sulfuric acid aqueous solution according to claim 1, characterized by further comprising the following step (6) subsequent to the step (3);

step (6): by adding a neutralizing agent into the concentrated solution of nickel and cobalt obtained in the step (3), under blowing mixed gas composed of sulfurous acid gas and air or oxygen gas, to subject the solution to the oxidation neutralization treatment, to remove a precipitate (c) containing manganese and cobalt generated, and to transfer the resultant solution after the oxidation neutralization treatment to the step (4).

3. The method for recovering nickel from an aqueous sulfuric acid solution according to claim 1, characterized by further comprising the following step (7) or step (8);

step (7): by adding a neutralizing agent to the back extraction liquid obtained in the step (4), to subject the solution to the neutralization treatment, and to separate and recover cobalt hydroxide generated;

step (8): by adding hydrogen sulfide gas or alkali sulfide to the back extraction liquid obtained in the step (4), to subject the solution to sulfurization treatment, and to separate and recover cobalt sulfide generated.

4. The method for recovering nickel from a sulfuric acid aqueous solution according to claim 1, characterized in that the oxidation neutralization treatment in the step (1) satisfies the following requisites (i) to (iii);

(i) content ratio of sulfurous acid gas in the mixed gas is 1 to 10% by volume relative to air or oxygen gas of dilution gas;

(ii) oxidation-reduction potential (based on a silver/silver chloride electrode) is 400 to 600 mV; and (iii) pH is 4.0 to 4.5.

5. The method for recovering nickel from a sulfuric acid aqueous solution according to claim 1, characterized in that the neutralization treatment in the step (2) satisfies the following requisite (iv);

(iv) pH is 7.5 to 7.7.

6. The method for recovering nickel from a sulfuric acid aqueous solution according to claim 1, characterized in that the dissolution treatment in the step (3) satisfies the following requisites (v) and (vi);

(v) the mixed hydroxides are mixed with the sulfuric acid solution to form a slurry, wherein the slurry concentration is 30 to 40% by mass;

(vi) pH at completion of dissolution of the mixed hydroxides is 1.5 to 2.2.

7. The method for recovering nickel from a sulfuric acid aqueous solution according to claim 1, characterized by comprising transferring the precipitate (b) to the step (1), in the step (3).

8. The method for recovering nickel from an aqueous sulfuric acid solution according to claim 1, characterized in that the neutralization treatment in the step (5) satisfies the following requisites (vii) to (ix;

(vii) pH is 7.5 to 8.0;

(viii) the neutralizing agent is magnesium hydroxide;

(ix) reaction temperature is a temperature of 80° C. to boiling temperature.

9. The method for recovering nickel from a sulfuric acid aqueous solution according to claim 2, characterized in that the oxidation neutralization treatment in the step (6) satisfies the following requisites (x) to (xiii);

(x) content ratio of sulfurous acid gas in the mixed gas is 1 to 10% by volume relative to air or oxygen gas;

(xi) oxidation-reduction potential (based on a silver/silver chloride electrode) is 500 to 600 mV;

(xii) pH is 5.0 to 6.0;

(xiii) the neutralizing agent is sodium hydroxide.

10. The method for recovering nickel from an sulfuric acid aqueous solution according to claim 1, characterized in that the sulfuric acid aqueous solution is a leach solution produced from the step to leach under high temperature and high pressure, by adding a sulfuric acid solution to slurry of a nickel laterite ore.

* * * * *